US009826433B2

(12) United States Patent
Kamath et al.

(10) Patent No.: US 9,826,433 B2
(45) Date of Patent: *Nov. 21, 2017

(54) METHOD AND SYSTEM FOR FLOW CONTROL BETWEEN A BASE STATION CONTROLLER AND A BASE TRANSCEIVER STATION

(75) Inventors: Sanjay Kamath, San Diego, CA (US); Michael A. Kongelf, San Diego, CA (US); Leif Woodahl, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1869 days.

This patent is subject to a terminal disclaimer.

(21) Appl. No.: 11/748,412

(22) Filed: May 14, 2007

(65) Prior Publication Data

US 2007/0223383 A1    Sep. 27, 2007

Related U.S. Application Data

(63) Continuation of application No. 10/010,990, filed on Dec. 5, 2001, now Pat. No. 7,237,007.

(51) Int. Cl.
*H04W 28/10* (2009.01)
*H04L 12/801* (2013.01)
(Continued)

(52) U.S. Cl.
CPC ............ *H04W 28/10* (2013.01); *H04L 47/10* (2013.01); *H04L 47/14* (2013.01); *H04L 47/27* (2013.01);
(Continued)

(58) Field of Classification Search
None
See application file for complete search history.

(56) References Cited

U.S. PATENT DOCUMENTS 4,901,307 A     2/1990  Gilhousen
5,063,562 A  * 11/1991  Barzilai et al. ............... 370/231
(Continued)

FOREIGN PATENT DOCUMENTS

GB    2361392 A    10/2001
JP    1013441 A     1/1989
(Continued)

OTHER PUBLICATIONS

Karandikar, Shrikrishna et al. "TCP Rate Control", ACM SIGCOMM Computer Communication Review. vol. 30, Issue1, Jan. 2000. pp. 45-58. ACM Press.
(Continued)

*Primary Examiner* — Jeffrey R Swearingen
(74) *Attorney, Agent, or Firm* — Larry J. Moskowitz

(57) ABSTRACT

According to a disclosed embodiment, a flow indication counter is incremented each time a data packet is transmitted from a buffer. When the number of data packets transmitted equals or exceeds a threshold number, a flow indication message comprising the buffer window size is generated and transmitted to the base station controller. Further, flow indication messages can be generated and transmitted every threshold time interval, independently of the number of data packets transmitted to ensure that flow indication messages are sent at least every preset time interval. Moreover, a system for flow control can be constructed comprising a flow indication counter module configured to provide an updated number of data packets transmitted. The system further comprises a window size monitoring module which determines the buffer window size and a message generating module which generates a flow indication message comprising the buffer window size.

26 Claims, 4 Drawing Sheets

(51) Int. Cl.

| | |
|---|---|
| *H04L 12/807* | (2013.01) |
| *H04L 12/835* | (2013.01) |
| *H04L 12/805* | (2013.01) |
| *H04W 28/14* | (2009.01) |
| *H04W 48/08* | (2009.01) |
| *H04W 92/12* | (2009.01) |

(52) U.S. Cl.
CPC ............. *H04L 47/30* (2013.01); *H04L 47/36* (2013.01); *H04W 28/14* (2013.01); *H04W 48/08* (2013.01); *H04W 92/12* (2013.01)

(56) References Cited

U.S. PATENT DOCUMENTS

| | | | |
|---|---|---|---|
| 5,103,459 | A | 4/1992 | Gilhousen |
| 5,193,151 | A * | 3/1993 | Jain ................................ 709/237 |
| 5,197,127 | A * | 3/1993 | Waclawsky et al. ......... 709/224 |
| 5,418,912 | A | 5/1995 | Christenson |
| 5,581,703 | A | 12/1996 | Baugher |
| 5,592,627 | A | 1/1997 | Burt |
| 5,696,903 | A | 12/1997 | Mahany |
| 5,701,465 | A | 12/1997 | Baugher |
| 5,748,901 | A * | 5/1998 | Afek et al. .................... 709/238 |
| 5,784,559 | A | 7/1998 | Frazier et al. |
| 5,862,337 | A | 1/1999 | Gray |
| 5,913,041 | A | 6/1999 | Ramanathan |
| 5,933,603 | A | 8/1999 | Vahalia |
| 5,974,518 | A | 10/1999 | Nogradi |
| 6,058,106 | A | 5/2000 | Cudak |
| 6,075,769 | A | 6/2000 | Ghanwani |
| 6,076,113 | A | 6/2000 | Ramanathan |
| 6,105,064 | A * | 8/2000 | Davis et al. .................. 709/224 |
| 6,205,120 | B1 | 3/2001 | Packer |
| 6,388,992 | B2 * | 5/2002 | Aubert et al. ................ 370/232 |
| 6,560,243 | B1 * | 5/2003 | Mogul ........................... 370/468 |
| 6,754,228 | B1 * | 6/2004 | Ludwig .......................... 370/468 |
| 6,788,704 | B1 * | 9/2004 | Lindsay ......................... 370/465 |
| 6,894,974 | B1 | 5/2005 | Aweva |
| 6,925,060 | B2 | 8/2005 | Mangin |
| 6,928,054 | B1 | 8/2005 | Montuno |
| 6,934,256 | B1 * | 8/2005 | Jacobson et al. ............. 370/235 |
| 7,142,508 | B2 * | 11/2006 | Tobagi et al. ................. 370/230 |
| 7,237,007 | B2 | 6/2007 | Kamath et al. |
| 2001/0036820 | A1 | 11/2001 | Fong |
| 2001/0051527 | A1 * | 12/2001 | Kuwahara ............. G01S 5/0045 455/456.6 |
| 2002/0031088 | A1 | 3/2002 | Packer |
| 2002/0054570 | A1 * | 5/2002 | Takeda .................. H04L 1/0023 370/252 |
| 2002/0172153 | A1 | 11/2002 | Vernon |
| 2003/0193893 | A1 | 10/2003 | Wen |
| 2004/0242219 | A1 * | 12/2004 | Oie et al. .................... 455/422.1 |

FOREIGN PATENT DOCUMENTS

| | | |
|---|---|---|
| JP | 11239163 A | 8/1999 |
| JP | 2000216811 A | 8/2000 |

OTHER PUBLICATIONS

Moorman, Jay et al. "Real-time Prioritized Call Admission Control in a Base Station Scheduler." Proceedings of the 3rd ACM International Workshop on Wireless Mobile Multimedia. 2000. ACM Press. pp. 28-37.

Mo. Jeonghoon et al. "Fair End-to-end Window-based Congestion Control". IEEE/ACM Transaction on Networking. Oct. 2000. vol. 8, Issue 5. pp. 556-567.

Christina Parsa et al. "Improving TCP Congestion Control over Internets with Heterogeneous Transmission of Media," Proceedings of IEEE ICNP 1999, Online, Oct. 1999, pp. 1-9.

European Search Report—EP09005104—Search Authority—Munich—Jun. 16, 2009.

Aweya, James et al. "Improving Network Service Quality with Explicit TCP Window Control." International Journal of Network Management. May 2001. vol. 11, Issue 3. pp. 169-188.

Dyer, Thomas et al. "A Comparison of TCP Performance Over Three Routing Protocols for Mobile Ad Hoc Networks." Proceedings of the 2nd ACM International Symposium on Mobile Ad Hoc Networking & Computing. 2001. pp. 56-66.

Jian-Hao Hu et al. "FDA: A Novel Base Station Flow Control Scheme for TCP over Heterogeneous Networks," Proceedings IEEE Infocom 2001, vol. 1 of 3. Conf. 20, Apr. 22, 2001, pp. 142-151.

Kunniyur, Srisankar et al. "Analysis and Design of an Adaptive Virtual Queue Algorithm for Active Queue Management." Proceedings of the 2001 Conference on Applications, Technologies, Architectures, and Protocols for Computer Communications. 2001. ACM Press. pp. 123-134.

Yano, Koichi et al. "A Window-based Congestion Control for Reliable Multicast Based on TCP Dynamics." Proceedings of the eighth ACM International Conference on Multimedia. ACM Press. 2000. pp. 249-258.

* cited by examiner

METHOD AND SYSTEM FOR FLOW CONTROL BETWEEN A BASE STATION CONTROLLER AND A BASE TRANSCEIVER STATION

BACKGROUND

Field

The present invention generally relates to the field of wireless communication systems, and more specifically to flow control between a base station controller and a base transceiver station.

Background

High Data Rate ("HDR") technology is a high-speed, high-capacity wireless technology optimized for packet data services. Using a single, data-dedicated 1.25 MHz channel for operation, HDR can deliver data at a peak data rate of 2.4 Mbps, which is significantly faster than many accesses provided over landline networks. Thus, the advantages of HDR include, among others, high-speed data transmission and high spectral efficiency.

HDR is the basis for the 1× Evolution Data Only (1×EV-DO) standard, which has been standardized by the Telecommunications Industry Association as TIA/EIA/IS-856. HDR is designed to be interoperable with existing wireless communication systems, for example a code division multiple access ("CDMA") system. In CDMA systems, each signal is separated from those of other users by coding the signal. Each user uniquely encodes its information signal into a transmission signal, which is then transmitted over a 1.25 MHz channel. The intended receiver, knowing the code sequences of the user, can decode the transmission signal to receive the information. The fact that a CDMA channel is 1.25 MHz simplifies the integration of HDR technology into the present CDMA framework.

Using CDMA for illustrative purposes, HDR technology can utilize existing CDMA infrastructure and architecture, including CDMA base station controllers ("BSC") and base transceiver stations ("BTS"). For example, in a CDMA system configured to be interoperable with HDR technology, data downloaded from the Internet by a user is routed through the BSC to the BTS, which transmits the data to the user via a data-dedicated 1.25 MHz channel or air-link. The BSC packetizes the stream of data it receives into individual 128-byte HDR packets (or "data packets") before transmitting the data packets to the BTS. The data packets are received by the BTS and placed in a buffer (or "queue") of fixed size to be transmitted to the user using an HDR protocol.

To reduce the possibility of overflowing or overrunning the buffer at the BTS, i.e. the BTS receiving more data from the BSC than the buffer can accommodate and/or transmit to the user, as well as the possibility of "starving" the buffer, i.e. the BTS not receiving data from the BSC when the buffer is empty, mechanisms to control the data flow between the BSC and the BTS are commonly employed. Generally, flow control mechanisms are based on the BTS advertising to the BSC the amount of space, or "window", available at the buffer for receiving more data in order for the BSC to determine how much data to transmit to the BTS.

One conventional method for flow control between the BSC and the BTS involves the BTS advertising its window size to the BSC at certain, preset, buffer capacity threshold points. For example, when the buffer nears capacity and reaches a preset high watermark threshold, the flow control mechanism is triggered, and the BTS sends a signal informing the BSC to stop transmitting additional data packets so as not to overrun the buffer. Overrunning the buffer can lead to problems such as data packets being dropped and lost at the buffer and having to be retransmitted, leading to less reliable data transmission. Further, having to retransmit dropped or lost data means incurring more overhead and slowing of communication. In the other instance when the buffer is nearing empty and hits a preset low watermark threshold, the flow control mechanism is triggered, and the BTS sends a signal telling the BSC to send more data packets. An empty buffer translates to wasted system resources, because it can result in frames of unused air-link that could be utilized to transmit data from the buffer.

A drawback to the conventional flow control mechanism described above is that feedback signals may not be received by the BSC in time to prevent overrunning and/or starving the buffer. For instance, by the time the BSC receives a signal from the BTS to stop sending more data, the BSC may have already put too much data "in flight" to avoid overrunning the buffer, leading to data packets being dropped at the buffer. In the case of an emptying buffer, a signal to send more data may not be received by the BSC in time for it to get data to the buffer before the buffer is completely empty, resulting in wasted air-link frames. Further, a flow control mechanism which is triggered by buffer capacity threshold points may result in the transmission of a high number of feedback signals which puts more strain on the system and increases system overhead.

There is thus a need in the art for an improved method for flow control between BSC and BTS. More particularly, there is a need for a method to reduce the likelihood of data overrun at a buffer, as well as the possibility of a starving buffer.

SUMMARY

Embodiments disclosed herein address the above stated needs by tying the flow of data between a base station controller and a base transceiver station directly to the rate of data transmitted from the base transceiver station to a wireless receiving unit such as a mobile unit.

In one aspect of the invention, a flow indication counter responsible for tracking the rate of data flowing out of a buffer at a base transceiver station is incremented each time a data packet is transmitted from the buffer. For example, the updated number of data packets transmitted from the buffer is compared to a threshold number which can be fifty. When the updated number of packets transmitted equals or exceeds the threshold number, the buffer window size is determined, and a flow indication message comprising the buffer window size is generated and transmitted to the base station controller. The buffer window size, which represents the amount of buffer space available for receiving more data, is used by the base station controller to determine the amount of data to transmit to the base transceiver station. Additionally, the flow indication message can further comprise a data packet ID of the last data packet received by the buffer, and this data packet ID is used by the base station controller to determine the proper order of data packets to transmit next.

In another aspect of the invention, a timer keeps track of an elapsed time since the transmission of the last message and triggers the generation and transmission of a flow indication message when the elapsed time equals or exceeds a threshold time interval. The threshold time interval can be, for example, 0.5 seconds. In this manner, the timer ensures that a flow indication message is sent at least every threshold time interval independently of the number of data packets transmitted from the buffer.

In another aspect of the invention, a system for flow control can be constructed comprising a flow indication counter module configured to provide an updated number of data packets transmitted from a buffer at a base station. The system can further comprise a window size monitoring module which determines the buffer window size when the updated number of data packets transmitted from the buffer equals or exceeds a threshold number. As an example, the threshold number can be set at fifty. The buffer window size is used by a message generating module which generates a flow indication message comprising the window size. Subsequently, the flow indication message is transmitted to a base station controller which uses the buffer window size to determine the amount of data to transmit to the base transceiver station.

DETAILED DESCRIPTION

The present invention is directed to method and system for flow control between a base station controller and a base transceiver station. Although the invention is described with respect to specific embodiments, the principles of the invention, as defined by the claims appended herein, can obviously be applied beyond the embodiments of the description described specifically herein. Moreover, certain details have been left out in order to not obscure the inventive aspects of the invention. The specific details not described in the present application are within the knowledge of a person of ordinary skill in the art.

The drawings in the present application and their accompanying detailed description are directed to merely example embodiments of the invention. To maintain brevity, other embodiments of the invention that use the principles of the present invention are not specifically described in the present application and are not specifically illustrated by the present drawings.

The word "exemplary" is used exclusively herein to mean "serving as an example, instance, or illustration." Any embodiment described herein as "exemplary" is not necessarily to be construed as preferred or advantageous over other embodiments.

Figure 1:
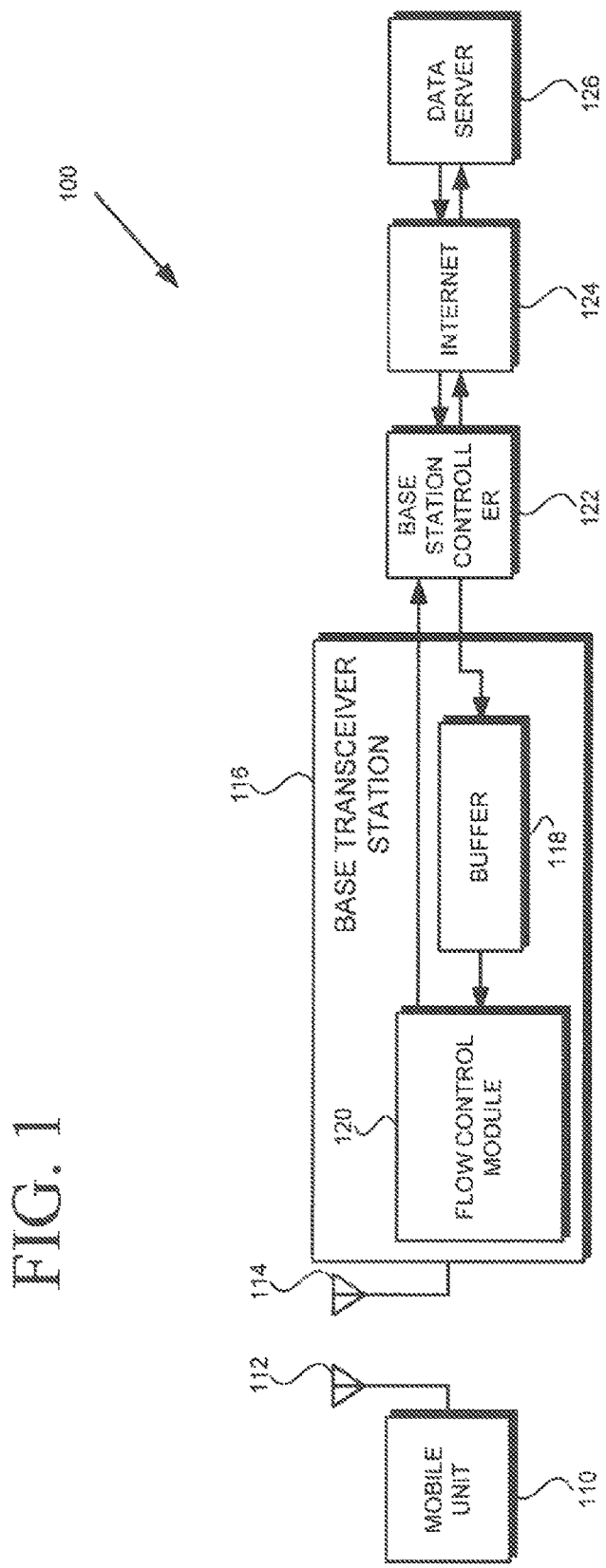
FIG. 1 is a block diagram of an exemplary wireless communication system in accordance with one embodiment of the invention.

FIG. 1 illustrates an exemplary wireless communication system in accordance with one embodiment. Exemplary wireless communication system 100 shown in FIG. 1 can comprise, for example, part of a code division multiple access ("CDMA") communication system configured to be interoperable with High Data Rate ("HDR") technology. The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in "high data rate" communication systems, such as that disclosed in U.S. patent application entitled "Method and Apparatus for High Rate Packet Data Transmission" Ser. No. 08/963,386 filed on Nov. 3, 1997, and assigned to the assignee of the present invention. The disclosure in that patent application is also hereby fully incorporated by reference into the present application.

Continuing with FIG. 1, exemplary wireless communication system 100 comprises components generally found in wireless communication systems, including a wireless receiving unit such as mobile unit 110, base transceiver station ("BTS") 116, base station controller ("BSC") 122, "Internet" 124, and data server 126. Mobile unit 110 and BTS 116 further comprise, respectively, antenna 112 and antenna 114. In wireless communication system 100, BTS 116 serves as a radio link between mobile unit 110 and the rest of the system. It is noted that wireless communication systems may comprise other components such as a mobile switching center and a public switched telephone network which are not shown in any of the FIG.s in order to not obscure the invention.

Exemplary wireless communication system 100 illustrates how Internet data can be communicated to mobile unit 110 by being routed from data server 126 through Internet 124 and BSC 122, and to BTS 116 which transmits the data to mobile unit 110 via, for example, a 1.25 MHz air-link channel. Data server 126 can be, for example, an HTTP or FTP server. The Internet data can be transmitted from BTS 116 to mobile unit 110 using an HDR protocol.

Continuing with FIG. 1, BTS 116 further comprises buffer 118 and flow control module 120. In exemplary wireless communication system 100, data received at BSC 122 is packetized into discrete 128-byte HDR data packets before being sent to BTS 116. BTS 116 receives the 128-byte data packets and places the data packets in buffer 118. Buffer 118, which is of a fixed-size, is used for temporarily storing the data for processing, or, in a streaming media application, to compensate for any delays in the arrival of related data packets, prior to transmission of the data packets to mobile unit 110. It is noted that a base transceiver station such as BTS 116 can include several buffers, for example transmit, retransmit and signaling buffers, and that each type of buffer is configured to receive and process different types of data for transmission to various wireless receiver units.

Continuing with FIG. 1, flow control module 120 monitors the rate of data "flowing out" of buffer 118. For example, flow control module 120 can count the number of data packets transmitted from buffer 118 to mobile unit 110. At the same time, flow control module 120 also monitors the window size of buffer 118, which is the amount of unoccupied space available at buffer 118 for receiving more data from BSC 122.

According to one embodiment, flow control module 120 utilizes the number of data packets transmitted from buffer 118 to determine an appropriate time to send feedback to BSC 122. It is noted that the feedback sent from flow control module 120 to BSC 122 is also referred to as a "flow indication message" in the present application. As an example, flow control module 120 can be configured to send a flow indication message after the transmission of every fifty data packets from buffer 118. However, it is apparent to a person of ordinary skill in the art that the threshold number of data packets transmitted from buffer 118 needed to trigger the transmission of a flow indication message can be set to some number other than fifty, depending on the requirements and resources of the system. The flow indication message advertises to BSC 122 how much data should be transmitted to buffer 118, based on the window size of buffer 118. In this manner, the control of how much data BSC 122 transmits to BTS 116 is based on how quickly data is transmitted from buffer 118. Thus, FIG. 1 illustrates a wireless communication system wherein the flow control between the BSC and the BTS is directly tied to how fast data is being transmitted from the buffer.

Figure 2:
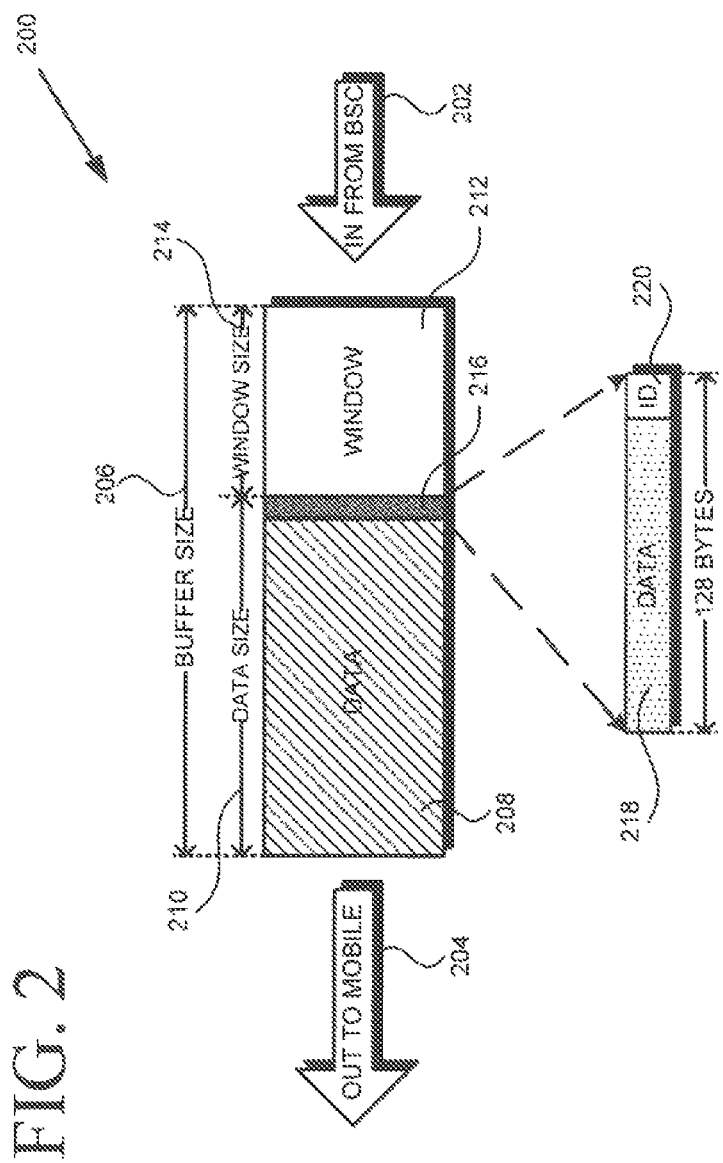
FIG. 2 is an illustrative representation of a buffer used to illustrate example implementations of the invention.

FIG. 2 shows an exemplary buffer used to illustrate one embodiment. Exemplary buffer 200 shown in FIG. 2 constitutes part of a base transceiver station in a wireless communication system such as a CDMA system configured to be interoperable with HDR technology, as described in FIG. 1. Buffer 200 can correspond, for example, to buffer 118 of base transceiver station 116 of wireless communication system 100 in FIG. 1. Buffer 200 can be a transmit buffer, for example, configured to queue bulk Internet data prior to transmission of the data to a wireless mobile unit, such as mobile unit 110 in FIG. 1.

Continuing with FIG. 2, buffer 200 has a fixed size or data capacity (i.e. buffer size 206), which can be, for example, approximately 50 Kbytes for a typical transmit buffer. Further, buffer 200 comprises data 208 with data size 210, which represents the amount of data queued at buffer 200 for transmission to wireless mobile units, and window 212 with window size 214, which represents the unused space available for receiving more data at buffer 200. The relative sizes of data 208 and window 212 are a function of the rate of data flow through buffer 200.

Continuing with FIG. 2, data flows into buffer 200 from a base station controller as shown by arrow 202, and flows out of buffer 200 to a wireless access terminal, such as a mobile unit, as shown by arrow 204. As discussed above, in HDR systems, data is received at the base transceiver station and placed in the buffer in discrete 128-byte data packets such as data packet 216. Thus, a typical 50 Kbyte transmit buffer can queue approximately 400 data packets, and a wireless communication system utilizing HDR technology operating at a peak data rate of 2.4 Megabits/second can transmit approximately 2,400 data packets each second.

Referring again to FIG. 2, data packet 216 constitutes one of a plurality of similarly packetized data packets of data 208 queued in buffer 200. Data packet 216 is enlarged in FIG. 2 to facilitate further discussion. As with other similarly packetized data packets in buffer 200, data packet 216 comprises data, i.e. data 218 and a packet ID, i.e. packet ID 220. Packet ID 220 is an identification tag "stamped" on data 218 by the base station controller and is unique to data packet 216. Packet ID 220 can be used, for example, to track the movement of data packet 216 as it moves through the communication system in a manner known in the art.

In one embodiment, the unique packet ID of the last data packet received by the buffer, i.e. the data packet received most recently, is included in the flow indication message transmitted to the base station controller. The packet ID of the data packet received most recently is also referred to as a "last packet ID" in the present application. As discussed above, the flow indication message is transmitted after a threshold number of data packets have been transmitted from the buffer. In the present embodiment, the flow indication message can also comprise the buffer window size in addition to the last packet ID.

The base station controller can utilize the information in such a flow indication message to determine not only how much data to send to the base transceiver station based on the buffer window size, but also the correct sequence of data packets to send next based on the last packet ID. In this manner, the flow of data from the base station controller to the base transceiver station is regulated by both the buffer window size and the identification of the last data packet received by the buffer. Thus, FIG. 2 shows an exemplary buffer used to illustrate one embodiment wherein the buffer window size and the packet ID of the last data packet received by the buffer are included in a flow indication message to refine the flow control between the BSC and the BTS.

Figure 3:
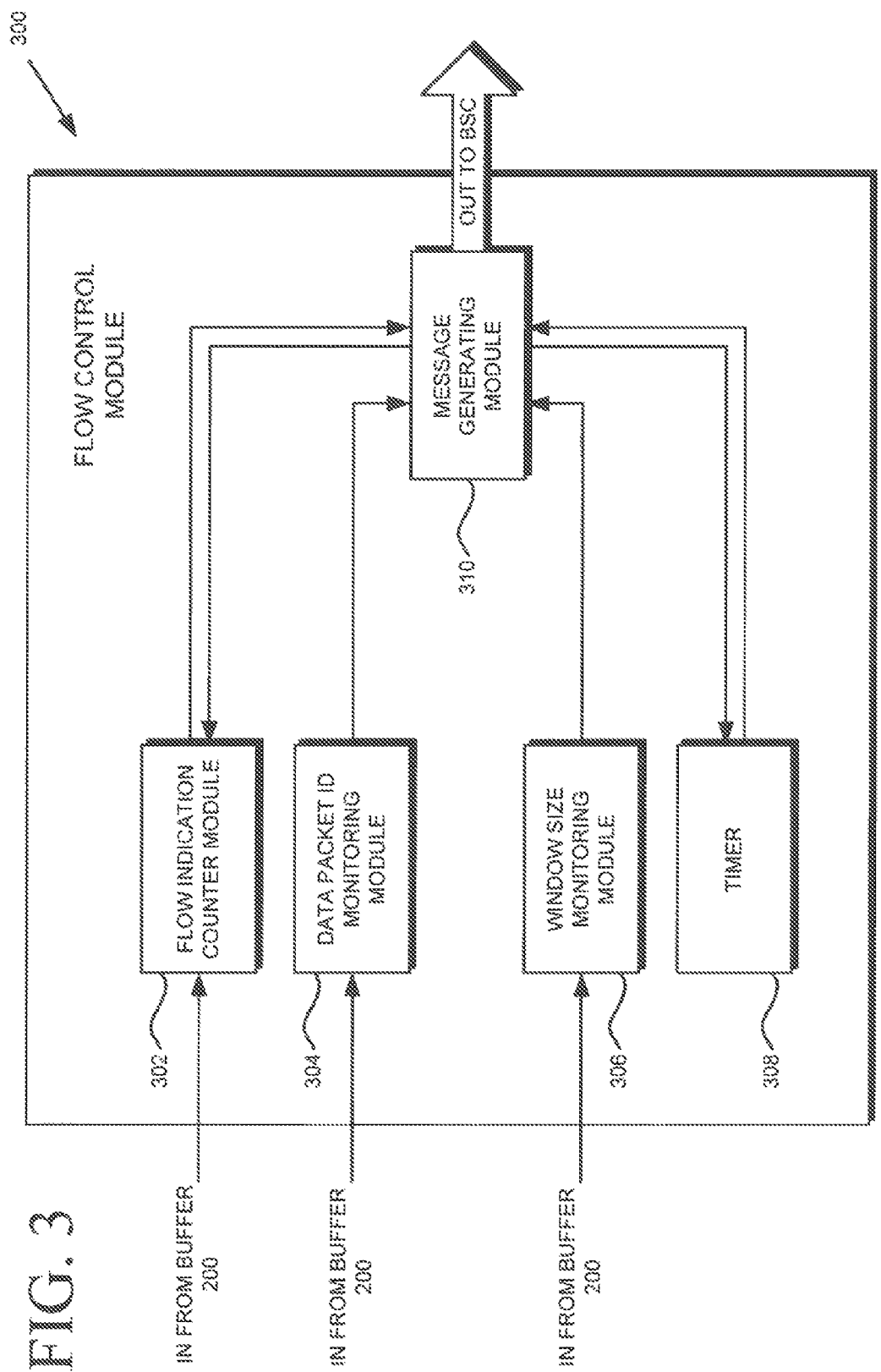
FIG. 3 is a block diagram of a flow control module in accordance with one embodiment of the invention.

FIG. 3 illustrates an exemplary flow control module in accordance with one embodiment. Flow control module 300 shown in FIG. 3 constitutes part of a base transceiver station in a wireless communication system, for example a CDMA system configured to be interoperable with HDR technology. Flow control module 300 can correspond, for example, to flow control module 120 in base transceiver station 116 of wireless communication system 100 in FIG. 1. Flow control module 300 comprises flow indication counter module 302, data packet ID monitoring module 304, window size monitoring module 306, timer 308, and message generating module 310. The flow of information into, between, and from the modules is indicated in the block diagram of FIG. 3 by arrows which also indicate the direction of information flow.

Continuing with FIG. 3, flow indication counter module 302 monitors the flow of data transmitted from a buffer which can be, for example, a transmit buffer such as buffer 200 in FIG. 2, which in turn corresponds to buffer 118 in FIG. 1. In one embodiment, flow indication counter module 302 keeps an updated count of the number of data packets transmitted from the buffer and compares the updated count to a threshold number. As an example, the threshold number can be fifty, but can alternatively be some other value, depending on the requirements and resources of the system. When the updated number of data packets transmitted from the buffer is equal to or greater than the threshold number, flow indication counter module 302 sends a signal to message generating module 310, triggering message generating module 310 to generate a flow indication message. Thus, flow indication counter module 302 is responsible for keeping track of the flow of data out of the buffer and for triggering the flow control mechanism when the number of data packets transmitted from the buffer equals or exceeds a threshold number.

Continuing with FIG. 3, data packet ID monitoring module 304 also receives information from the buffer. Data packet ID monitoring module 304 monitors the reception of each data packet by the buffer and reads the packet ID of the data packets. Using FIG. 2 for illustrative purposes, data packet ID monitoring module 304 can read packet ID 220 corresponding to data packet 216 as data packet 216 is received by buffer 200. The packet ID of each subsequent data packet received by the buffer is similarly read by packet ID monitoring module 304. Data packet ID monitoring module 304 provides message generating module 310 with the packet ID of the data packet received most recently by the buffer. Message generating module 310 can store the packet ID of the data packet received most recently for subsequent processing.

Continuing with FIG. 3, window size monitoring module 306 is configured to monitor the window size of the buffer. The window size, which represents the amount of buffer space available for receiving additional data, is directly proportional to the rate of data flowing into and out of the buffer. An example of a window size in a buffer was shown as window size 214 in buffer 200 in FIG. 2. Straightforwardly, the window size, such as window size 214, is reduced as the buffer receives more data packets from the base station controller, and conversely, the window size is increased as data packets are transmitted from the buffer to wireless access terminals or wireless mobile units. Window size monitoring module 306 monitors the buffer window size and provides message generating module 310 with the window size.

The information received by message generating module 310 from flow indication counter module 302, data packet ID monitoring module 304 and window size monitoring module 306, is utilized by message generating module 310 to generate a flow indication message. Message generating module 310 is triggered by flow indication counter module 302 when a threshold number of data packets has been transmitted from the buffer. Once triggered, message generating module 310 generates a flow indication message comprising the buffer window size and the packet ID of the data packet received most recently by the buffer.

The flow indication message is then transmitted to the base station controller which utilizes the information, i.e. the buffer window size and the packet ID, to determine how much data it can transmit to the buffer and which data packet should be transmitted next. Transmission of the flow indication message can be performed, for example, by a transmit module at the base station. It is noted that the base station transmit module is not shown in any of the FIGS. Further, message generating module 310 notifies flow indication counter module 302 each time a flow indication message is transmitted so that flow indication counter module 302 can reset the updated number of data packets transmitted from the buffer to zero. By tying the flow control mechanism directly to the rate of data flowing out of the buffer, the present embodiment provides a more reliable method for flow control than conventional flow control methods. Further, the possibility of overrunning the buffer is reduced because the base station controller receives information on the rate of data leaving the buffer and can adjust the amount of data it sends to the buffer accordingly.

In another instance, message generating module 310 is triggered to generate and transmit a flow indication message after a threshold time interval has elapsed since the transmission of a last flow indication message, even if the threshold number of data packets transmitted from the buffer has not been reached, i.e. even if flow indication counter module 302 does not trigger message generating module 310. Timer 308 in flow control module 300 keeps track of the elapsed time between flow indication messages sent from message generating module 310. If a threshold time interval elapses without a flow indication message being sent, timer 308 triggers message generating module 310 to generate and transmit a flow indication message. As an example, the threshold time interval can be 0.5 seconds. The flow indication message can comprise information message generating module 310 receives from data packet ID monitoring module 304, i.e. the last packet ID, and window size monitoring module 306, i.e. the buffer window size. Thus, timer 308 triggers message generating module 310 to send a flow indication message independently of the number of data packets transmitted from the buffer.

Continuing with FIG. 3, timer 308 is important in situations where the buffer has space available for receiving more data but the base station controller is not transmitting any data. This situation can occur, for instance, when flow indication messages notifying the base station controller of available buffer space are lost or dropped at the base station controller—the base station controller is, in effect, not aware that the buffer can receive more data. Consequently, once the buffer is emptied of data and additional data packets are not received form the base station controller, the flow control mechanism could become "gridlocked" since no data packet is being transmitted from the buffer to trigger the flow control mechanism. In other words, flow indication counter module 302 would not trigger message generating module 310 since the threshold number of data packets transmitted needed would not be reached. However, because timer 308 triggers message generating module 310 independently of the number of data packets transmitted from the buffer, timer 308 ensures that flow indication messages are sent even if the buffer is empty and no data packet is being transmitted from the buffer. In this manner, gridlock of the flow control mechanism is prevented. Further, because a flow indication message is sent at least every preset time interval, the possibility of starving the buffer is greatly reduced.

Thus, FIG. 3 illustrates an exemplary flow control module which generates and transmits flow indication messages after a threshold number of data packets has been transmitted from a buffer in accordance with one embodiment. Further, FIG. 3 illustrates a safeguard component that triggers the generation and transmission of flow indication messages independently of the number of data packets transmitted from the buffer.

Figure 4:
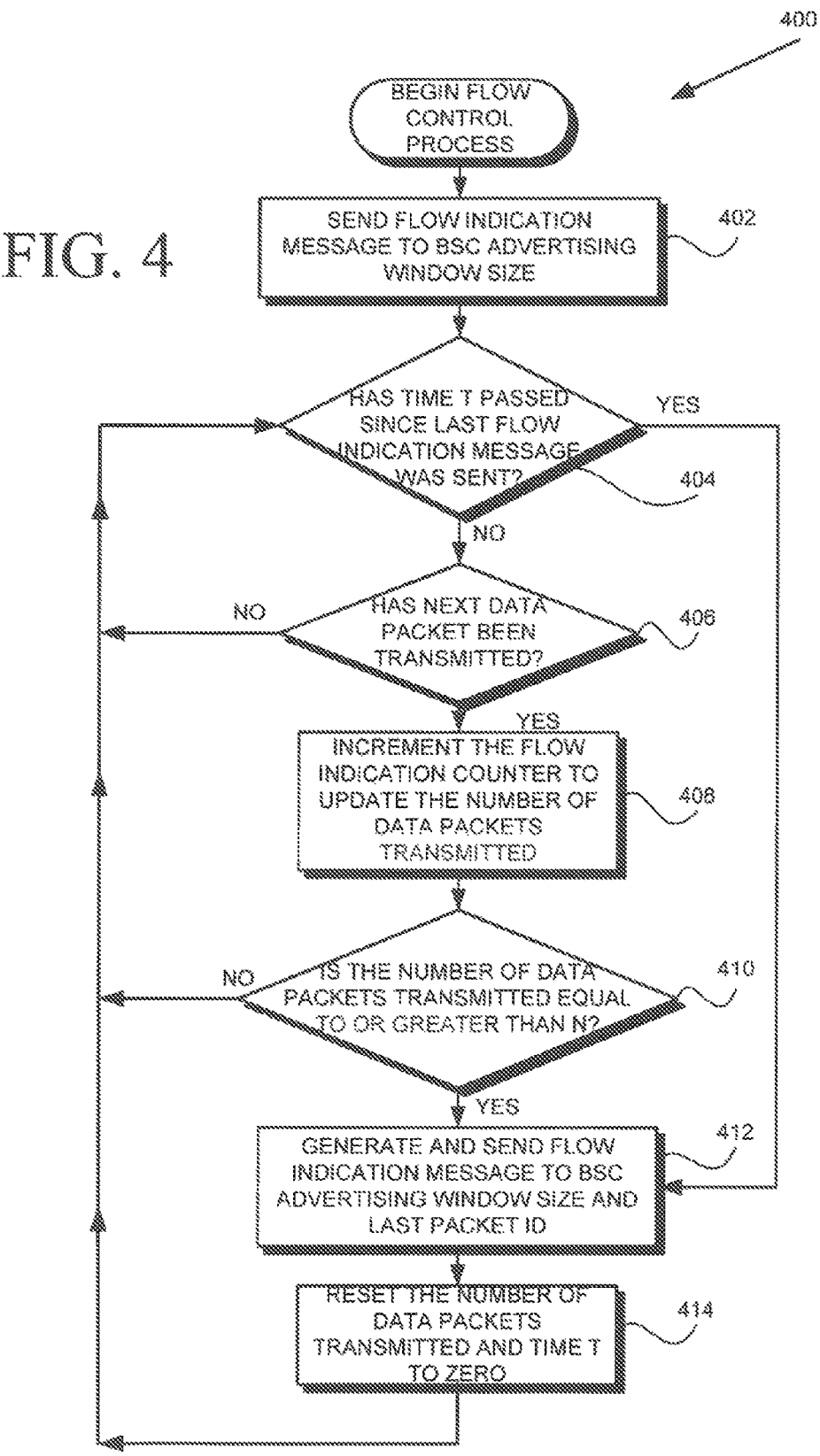
FIG. 4 is a flowchart of a process for flow control between a base station controller and a base transceiver station in accordance with one embodiment of the invention.

FIG. 4 shows flowchart 400 describing an exemplary process for flow control between a base station controller and a base transceiver in accordance with one embodiment. Flowchart 400 shown in FIG. 4 describes a process which can be performed at a base transceiver station in a wireless communication system, for example a CDMA system configured to be interoperable with HDR technology. The process shown in flowchart 400 can be performed by a flow control module such as flow control module 300 in FIG. 3. Thus, for illustrative purposes, the process shown in flowchart 400 will be described in the context of flow control module 300 in FIG. 3.

Referring to FIG. 4, the flow control process begins when a connection is made between a base station controller and a base transceiver station in which a flow control module such as flow control module 300 is housed. At step 402, immediately after connection is made, a flow indication message is transmitted to the base station controller. The flow indication message can be transmitted by message generating module 310 and can comprise the window size of a buffer at the base transceiver station. As an example, the buffer can be a transmit buffer such as buffer 118 in FIG. 1. The purpose of sending this initial flow indication message is to advertise to the base station controller the amount of buffer space available for receiving data.

Continuing with flowchart 400 in FIG. 4, it is determined at step 404 whether or not a threshold time interval has elapsed since the last flow indication message was sent. It is noted that the last flow indication message is also referred to as the "last message" in the present application. The threshold time interval, which can be 0.5 seconds, for example, is also referred to as "time T" in the present application. Tracking of the elapsed time can be performed by a timer such as timer 308 in flow control module 300 in a manner known in the art. When the timer determines at step 404 that at least time T has elapsed since the last message was sent, then the flow control process proceeds to step 412 where a new flow indication message is sent.

If instead the timer determines at step 404 that less than time T has elapsed since the last message was sent, then the flow control process proceeds to step 406. At step 406, it is determined whether or not a new or "next" data packet has been transmitted from the buffer. This determination can be performed by software in a flow indication counter module such as flow indication counter module 302. When a next data packet has not been transmitted, then the process returns to step 404 to determine again whether time T has elapsed since the last flow indication message was sent. In this manner, i.e. looping back to step 404 when a next data packet has not been transmitted from the buffer, a safeguard mechanism is available to make certain that flow indication messages will be sent at least every time T.

If it is determined at step 406 that a next data packet has been sent, then the process proceeds to step 408, and the flow indication counter, such as flow indication counter module 302, is incremented to update the number of data packets transmitted from the buffer. The updated number of data packets transmitted from the buffer can be stored in a memory device in the flow indication module.

At step 410, the updated number of data packets transmitted from the buffer is compared to a threshold number of data packets transmitted. The threshold number of data packet transmitted, which can be set at 50, for example, is also referred to as a "threshold number" in the present application. Comparison of the updated number of data packets transmitted with the threshold number can be performed, for example, by software in flow indication counter 302. When the updated number of data packets transmitted from the buffer is less than the threshold number, the process returns to step 404. By looping back to step 404 when the updated number of data packets transmitted is less than the threshold number, the process makes certain that flow indication messages are sent at least every time T, even when the flow of data out of the buffer is relatively slow, and the time interval before the threshold number is reached is increased.

If it is determined at step 410 that the updated number of data packets transmitted from the buffer is equal to or greater than the threshold number, then the process proceeds to step 412. At step 412, a flow indication message is generated and sent to the base station controller. The flow indication message can comprise the buffer window size and the packet ID of the last data packet received by the buffer, i.e. last packet ID. The flow indication message can be generated and sent by message generating module 310 which receives the buffer window size from window size monitoring module 306 and the last packet ID from packet ID monitoring module 304. The steps of generating and transmitting the flow indication message to the base station controller are also referred to as "advertising" in the present application. Thus, the flow indication message advertises the information to the base station controller which uses the information to determine how much data to transmit to the buffer, as well as the proper sequence of data packets to transmit next.

Continuing with flowchart 400, the process then proceeds to step 414 where the updated number of data packets transmitted and time T are reset to zero. The process then returns to step 404 in order to continue controlling the flow of data from the base station controller to the base transceiver station. It is noted that the process does not terminate, or "end", until the connection between the base station controller and the base transceiver station is severed. Thus, FIG. 4 shows an example process for flow control between a base station controller and a base transceiver station in accordance with one embodiment.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. The software module, also called a computer program in the present application, may contain a number of source code or object code segments and may reside in any computer readable medium such as a RAM memory, flash memory, ROM memory, EPROM memory, EEPROM memory, registers, hard disk, a removable disk, a CD-ROM, a DVD-ROM or any other form of computer readable medium known in the art. An exemplary computer readable medium is coupled to the processor where the processor can read information from, and write information to, the computer readable medium. In the alternative, the computer readable medium may be integral to the processor. The processor and the computer readable medium may reside in an Application Specific Integrated Circuit ("ASIC"). The processor and the computer readable medium may reside in a flow control module. In the alternative, the processor and the computer readable medium may reside as discrete components in the flow control module.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method for flow control in a base station, comprising:
   transmitting an initial flow indication message indicating an initial window size that defines an initial amount of space available in a buffer of the base station for receiving data from a base station controller, wherein the initial flow indication message is transmitted when a connection is made between the base station and the base station controller;
   determining whether a threshold time interval has elapsed since the initial flow indication message was transmitted from the base station; determining that a data packet is wirelessly transmitted from the buffer of the base station to a mobile unit;
   incrementing, at the base station, a flow indication counter when the data packet is wirelessly transmitted from the buffer of the base station to the mobile unit, wherein the flow indication counter indicates a number of data packets transmitted out of the buffer;
   determining whether the flow indication counter is greater than or equal to a threshold number;
   generating an updated flow indication message when the flow indication counter is greater than or equal to the threshold number and when the threshold time interval has elapsed; and
   transmitting the updated flow indication message to the base station controller.

2. The method of claim 1 wherein the threshold number is fifty.

3. The method of claim 1 further comprising: determining a packet ID of a data packet received by the buffer before the generating of the updated flow indication message.

4. The method of claim 3 wherein the packet ID is a last packet ID of a last data packet received by the buffer before the generating of the updated flow indication message.

5. The method of claim 1, wherein the threshold time interval is 0.5 seconds.

6. The method of claim 1, wherein the initial flow indication message and the updated flow control message control a respective data rate of data packets transmitted from the base station controller to the base station.

7. The method of claim 1, further comprising: resetting the updated number of data packets transmitted out of the buffer to zero when the updated flow indication message is transmitted to the base station controller.

8. The method of claim 1, further comprising: resetting the threshold time interval to zero when the updated flow indication message is transmitted to the base station controller.

9. An apparatus for flow control in a base station, comprising:
   means for transmitting an initial flow indication message indicating an initial window size that defines an initial amount of space available in a buffer of the base station for receiving data from a base station controller, wherein the initial flow indication message is transmitted when a connection is made between the base station and the base station controller;
   means for determining whether a threshold time interval has elapsed since the flow indication message was transmitted from the base station;
   means for determining that a data packet is wirelessly transmitted from the buffer of the base station to a mobile unit;
   means for incrementing, at the base station, a flow indication counter when the data packet is wirelessly transmitted from the buffer of the base station to the mobile unit, wherein the flow indication counter indicates a number of data packets transmitted out of the buffer;
   determining whether the flow indication counter is greater than or equal to a threshold number;
   means for generating an updated flow indication message when the flow indication counter is greater than or equal to the threshold number and when the threshold time interval has elapsed; and
   means for transmitting the updated flow indication message to the base station controller.

10. The apparatus of claim 9 wherein the threshold number is fifty.

11. The apparatus of claim 9 further comprising: means for determining a packet ID of a data packet received by the buffer before the means for generating generates the updated flow indication message.

12. The apparatus of claim 11 wherein the packet ID is a last packet ID of a last data packet received by the buffer before the means for generating generates the updated flow indication message.

13. The apparatus of claim 9, wherein the threshold time interval is 0.5 seconds.

14. The apparatus of claim 9, further comprising: means for resetting the updated number of data packets transmitted out of the buffer to zero when the updated flow indication message is transmitted to the base station controller.

15. A method for flow control in a base station, comprising:
   transmitting an initial flow indication message indicating an initial window size that defines an initial amount of space available in a buffer of the base station for receiving data from a base station controller, wherein the initial flow indication message is transmitted when a connection is made between the base station and the base station controller;
   determining whether a threshold time interval has elapsed since the initial flow indication message was transmitted from the base station;
   determining that a data packet is wirelessly transmitted from the buffer of the base station to a mobile unit;
   incrementing, at the base station, a flow indication counter when the data packet is wirelessly transmitted from the buffer of the base station to the mobile unit, wherein the flow indication counter indicates a number of data packets transmitted out of the buffer;
   determining a packet identifier (ID) of a data packet received by the buffer; determining whether the number of data packets transmitted out of the buffer is equal to or greater than a threshold number;
   generating an updated flow indication message when the flow indication counter is greater than or equal to the threshold number and when the threshold timer interval has elapsed; and transmitting the updated flow indication message to the base station controller.

16. The method of claim 15 wherein the threshold number is fifty.

17. The method of claim 15 wherein the packet ID is a last packet ID of a last data packet received by the buffer before the generating of the updated flow indication message.

18. The method of claim 15, wherein the threshold time interval is 0.5 seconds.

19. A non-transitory computer readable medium storing computer executable code for flow control at a base station comprising code to:
transmit an initial flow indication message indicating an initial window size that defines an initial amount of space available in a buffer of the base station for receiving data from a base station controller, wherein the initial flow indication message is transmitted when a connection is made between the base station and the base station controller;
determine whether a threshold time interval has elapsed since the flow indication message was transmitted from the base station;
determine that a data packet is wirelessly transmitted from the buffer of the base station to a mobile unit;
increment, at the base station, a flow indication counter when the data packet is wirelessly transmitted from the buffer of the base station to the mobile unit, wherein the flow indication counter indicates a number of data packets transmitted out of the buffer;
determine whether the number of data packets transmitted out of the buffer is equal to or greater than a threshold number;
generate an updated flow indication message when the flow indication counter is greater than or equal to a threshold number and when the threshold time interval has elapsed; and
transmit the updated flow indication message to the base station controller.

20. The computer readable medium of claim 19 wherein the threshold number is fifty.

21. The computer readable medium of claim 19, further comprising code to: determine a packet ID of a data packet received by the buffer before the generating of the updated flow indication message.

22. The computer readable medium of claim 21 wherein the packet ID is a last packet ID of a last data packet received by the buffer before the generating of the updated flow indication message.

23. The computer readable medium of claim 21 wherein the flow indication message further comprises the packet ID.

24. The computer readable medium of claim 19, wherein the threshold time interval is 0.5 seconds.

25. An apparatus for flow control in a base station, comprising:
a memory configured to store data; and
one or more processors communicatively coupled with the memory, wherein the one or more processors and the memory are configured to:
transmit an initial flow indication message indicating an initial window size that defines an initial amount of space available in a buffer of the base station for receiving data from a base station controller, wherein the initial flow indication message is transmitted when a connection is made between the base station and the base station controller;
determine whether a threshold time interval has elapsed since the flow indication message was transmitted from the base station;
determine that a data packet is wirelessly transmitted from the buffer of the base station to a mobile unit;
increment, at the base station, a flow indication counter when the data packet is wirelessly transmitted from the buffer of the base station to the mobile unit, wherein the flow indication counter indicates a number of data packets transmitted out of the buffer;
determine whether the number of data packets transmitted out of the buffer is equal to or greater than a threshold number;
generate an updated flow indication message when the flow indication counter is greater than or equal to the threshold number and when the threshold time interval has elapsed wherein the updated flow indication message includes an updated window size of the buffer determined when the flow indication counter is greater than or equal to the threshold number or when the elapsed time is equal to or greater than the threshold time interval; and
transmit the updated flow indication message to the base station controller.

26. The apparatus of claim 25, wherein the one or more processors and the memory are further configured to: determine a packet ID of a last data packet received by the buffer before the generating of the updated flow indication message; and include the packet ID in the flow indication message.

* * * * *